US008992159B2

(12) United States Patent
Sintek et al.

(10) Patent No.: US 8,992,159 B2
(45) Date of Patent: Mar. 31, 2015

(54) LOG LOADER (75) Inventors: Brad A. Sintek, Sandy, OR (US);
Joseph B. Crover, Gresham, OR (US);
Brandon K. Gray, Damascus, OR (US);
Greg M. Hildebrandt, West Linn, OR (US)

(73) Assignee: Pierce Pacific Manufacturing, Inc., Portland, OR (US)

(*) Notice: Subject to any disclaimer, the term of this patent is extended or adjusted under 35 U.S.C. 154(b) by 400 days.

(21) Appl. No.: 13/344,366

(22) Filed: Jan. 5, 2012

(65) Prior Publication Data
US 2013/0177373 A1    Jul. 11, 2013

(51) Int. Cl.
*A01G 23/00* (2006.01)
*B27B 25/00* (2006.01)
*B66C 1/42* (2006.01)
(Continued)

(52) U.S. Cl.
CPC ............... *A01G 23/093* (2013.01); *B66C 1/585* (2013.01); *A01G 23/089* (2013.01); *B66C 3/04* (2013.01); *A01G 23/083* (2013.01); *B66C 1/427* (2013.01); *B66C 1/68* (2013.01)
USPC .......................................................... 414/741

(58) Field of Classification Search
CPC ...... E02F 3/4135; E02F 19/087; F15B 15/02; B60P 3/41; B66C 1/42; B66C 1/68; B66C 1/427; B66C 1/447; B66C 1/585; B66C 3/04; B66C 3/16; A01G 23/097; A01G 23/095; A01G 23/083; A01G 23/08; A01G 23/091
USPC .......... 60/484; 144/24.13, 336, 343; 294/106; 414/32, 729, 736, 739, 741, 560
See application file for complete search history.

(56) References Cited

U.S. PATENT DOCUMENTS

| 4,194,542 A | 3/1980 | Eriksson |
| 5,082,036 A | 1/1992 | Vierikko |

(Continued)

FOREIGN PATENT DOCUMENTS

| EP | 2106691 A1 | 10/2009 |
| WO | 02-19801 A1 | 3/2002 |
| WO | 2010-002339 A1 | 1/2010 |

OTHER PUBLICATIONS

YouTube, LLC, Website, Valmet 940 GP Processor 1982, http://www.youtube.com/watch?v=m5zaXZtsASs, accessed on Jun. 28, 2013.

(Continued)

*Primary Examiner* — Saul Rodriguez
*Assistant Examiner* — Ronald Jarrett
(74) *Attorney, Agent, or Firm* — Schwabe, Williamson & Wyatt (57) ABSTRACT Embodiments described herein provide methods, apparatuses, and systems for moving, loading, and/or sorting logs. A log grapple may include opposing arm assemblies and independently positionable drive wheels disposed between the arms. The log grapple may be operable in a grapple mode, in which the arms are in a closed position and the drive wheels are in an open position, and a feed mode, in which the arms and the drive wheels are in closed positions. In feed mode, the first and second drive wheels may be rotated to drive the log through the arms. The log grapple may be further configured to delimb, measure, and/or cut logs in the feed mode. A log grapple may also include a measuring wheel assembly. Optionally, the measuring wheel assembly may include a hydraulic actuator configured to retract the measuring wheel and a gas spring configured to extend the measuring wheel.

18 Claims, 7 Drawing Sheets (51) Int. Cl.
*A01G 23/093* (2006.01)
*A01G 23/089* (2006.01)
*A01G 23/083* (2006.01)
B66C 1/58 (2006.01)
B66C 3/04 (2006.01)
B66C 1/68 (2006.01)

(56) References Cited

U.S. PATENT DOCUMENTS

| | | |
|---|---|---|
| 5,219,010 A | 6/1993 | Eriksson |
| 5,785,101 A | 7/1998 | Wildey |
| 5,957,177 A | 9/1999 | Smith et al. |
| 5,975,168 A * | 11/1999 | Ericksson .................... 144/343 |
| 6,263,931 B1 | 7/2001 | Ericksson |
| 6,345,651 B1 | 2/2002 | Havimaki et al. |
| 6,622,761 B1 | 9/2003 | Paakkunainen et al. |
| 6,758,248 B2 | 7/2004 | Nilsson et al. |
| 6,962,178 B2 * | 11/2005 | Duval .......................... 144/3.1 |
| 7,954,524 B2 | 6/2011 | Voermans |
| 2010/0282367 A1 * | 11/2010 | Stevenson et al. ............ 144/336 |
| 2010/0313999 A1 | 12/2010 | Smythe |

OTHER PUBLICATIONS

International Search Report and Written Opinion for PCT International Application No. PCT/US2013/020215, mailed Apr. 25, 2013 (12 pages).

First Examination Report of New Zealand Patent Application No. 605379, dated Jan. 8, 2013 (2 pages).

* cited by examiner

LOG LOADER

TECHNICAL FIELD

Embodiments herein relate to methods, systems, and apparatuses for moving, sorting, and loading logs onto a transport at a harvesting site.

BACKGROUND

In logging operations, processors are typically used to delimb, measure and cut logs. In contrast, loaders are used to move, sort and load logs onto a logging trailer. Some loaders include a log grapple with hydraulically powered hinged jaws. The log grapple is generally mounted to a boom, which is mounted in turn on a base such as an excavator. The loader is used to move logs toward a desired position, such as the logging trailer or toward the loader itself. The logs are moved by extending the boom, closing the hinged jaws around the log, and moving the boom inward to slide the log toward the desired position. The log is then released and the boom is re-extended to position the grapple closer to the center of gravity of the log. This allows the log to be grasped near its center of gravity to be moved closer to the desired position.

Skidders and yarders are frequently used to drag or haul individual logs to a landing for loading. Alternatively, in shovel logging, an excavator with a boom-mounted logging grapple is used to move fallen trees or logs toward the landing. As the excavator reaches an area with fallen trees or logs, the boom is extended and the grapple is used to grasp one end of a log. The excavator raises the boom to lift the log, turns 180 degrees, and then releases the log to move the log nearer to the landing. The remaining trees or logs within reach are moved in the same manner. If the distance to the landing exceeds the reach of the boom and grapple, the excavator is then repositioned and the process is repeated as needed in order to move the trees or logs the remaining distance to the landing.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Embodiments described herein provide methods, apparatuses and systems for moving, loading and/or sorting logs. A log grapple may include a frame, first and second pairs of arms pivotally coupled to the frame, and one or more drive wheels. The arms of each pair may be movable toward one another into a closed position (e.g., around one or more trees or logs) and away from one another (e.g., to release the one or more trees or logs). The log grapple may also include a measuring wheel assembly with a measuring wheel and one or more actuators. Optionally, the log grapple may further include one or more of a center drive system, a saw, a blade, and/or a pivot mount coupled to the frame.

In one embodiment, the log grapple may be configured to load, sort, and/or move logs of various diameters. The one or more drive wheels may include first and second drive wheels positioned between the first pair of arms and the second pair of arms. The opposed first and second drive wheels may be movable toward and away from one another independently of the position of the arms.

The log grapple may have a "start mode," a "grapple mode," and a "feed mode." In the "start mode," the arms are in an open position. In the "grapple mode," the arms are in a closed position and the first and second drive wheels are in an open position. While the log grapple is in the "grapple mode" and engaging a log, the log may be supported on the arms with minimal or no contact between the log and the first and second drive wheels. Thus, in the grapple mode, the log grapple may be used to grasp a tree from a pile of trees and/or to handle logs without damage to the log. In addition, keeping the first and second drive wheels apart while the arms are moved toward and away from one another allows the arms to be used to penetrate a deck of logs or sort through a deck of logs.

In the "feed mode," the arms are in a closed position and the first and second drive wheels are also in a closed position. While the log grapple is in the "feed mode" and engaging a log, the log may be supported on the first and second drive wheels. The first and second drive wheels may be rotatable in a first rotary direction and in an opposite second rotary direction to drive the log through the arms in a first linear direction and in a second linear direction, respectively. In some examples, the log grapple may be configured to delimb, measure, and/or cut logs while in the "feed mode."

In other embodiments, the measuring wheel assembly may be selectively actuated to contact a log and be retracted away from the log by one or more actuators. In some examples, the measuring wheel assembly may be extended and/or retracted independently of the position of the arms. The measuring wheel assembly or portion thereof may be coupled to the frame between the first and second pairs of arms. In some embodiments, the one or more actuators may include a first actuator and a second actuator. The first actuator may be configured to extend the measuring wheel, and the second actuator may be configured to retract the measuring wheel. Optionally, the first and the second actuator may be integrated within a single unit. In one example, the second actuator is a hydraulic cylinder assembly and the first actuator is a force loading member, such as a gas spring, disposed within the hydraulic cylinder assembly.

Other embodiments provide a system for moving, loading, and sorting logs. The system may include a base, a crane arm coupled to the base, and a log grapple pivotally coupled to the crane arm. In operation, the first end of the crane arm may be extended toward a log and the log grapple arms may be moved into a closed position around the log. The drive wheels may be moved from an open position to a closed position to engage the log. With the arms remaining in a closed position, the drive wheels may be rotated in a first rotary direction to drive the log through the arms in a first linear direction. The drive wheels may be subsequently rotated in an opposite second rotary direction to drive the log through the arms in a second linear direction opposite to the first linear direction. In some examples, the drive wheels may be disengaged from the log (i.e., moved into an open position) while the arms remain in a closed position. The crane arm and/or base may be repositioned while the log remains engaged with the arms and/or drive wheels.

Optionally, the drive wheels may be used to drive the log back and forth in order to delimb the log via one or more delimbing knives mounted to the frame/arms, to measure the log, to advance the log grapple toward the center of gravity of the log, and/or to advance or stabilize the log to a desired position for sawing by a saw assembly mounted to the frame. In some embodiments, the log grapple and the first end of the crane arm may be coupled by a pivot mount. The relatively low profile of such log grapples may allow them to be used in place of traditional grapple.

Figure 1:
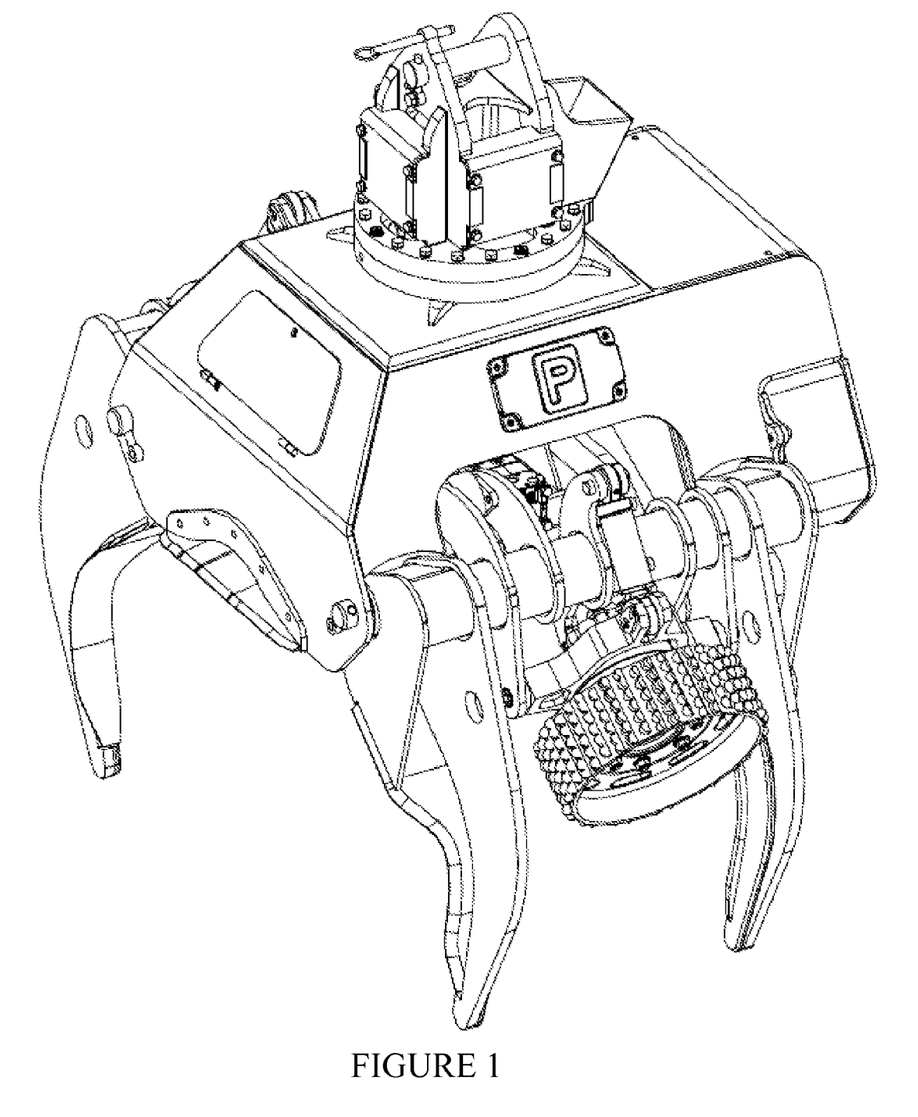
FIG. 1 is a perspective view of a log grapple in accordance with various embodiments.
Figure 2A:
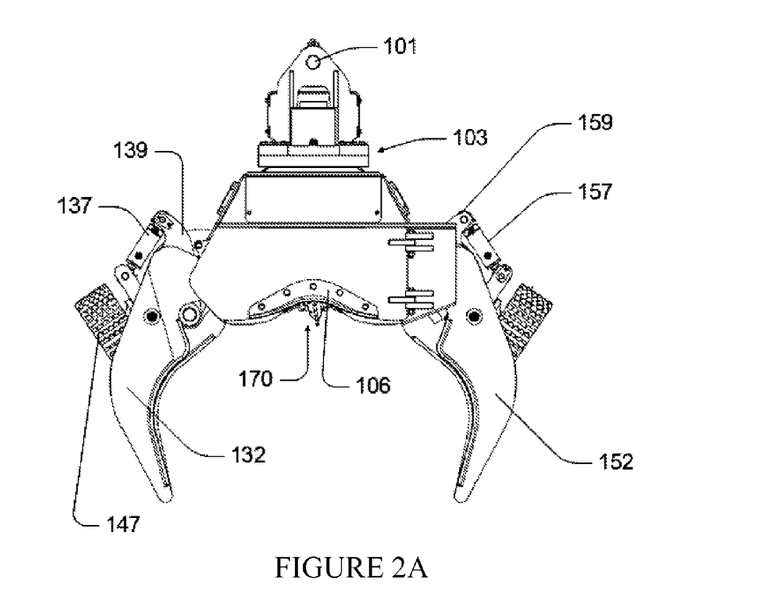
FIGS. 2A-C and 2D are side and end elevation views, respectively, of the log grapple of FIG. 1.
Figure 2B:
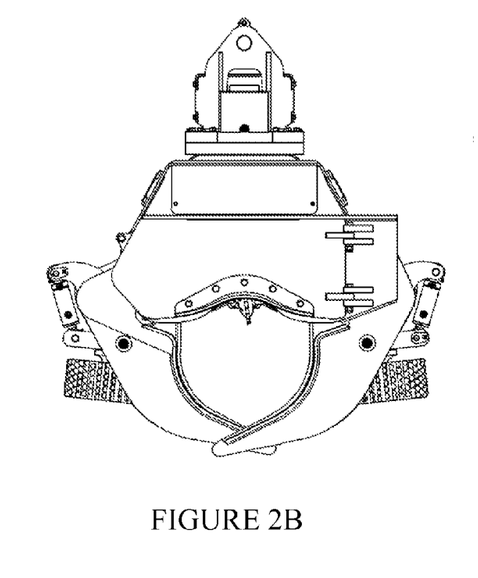
Figure 2C:
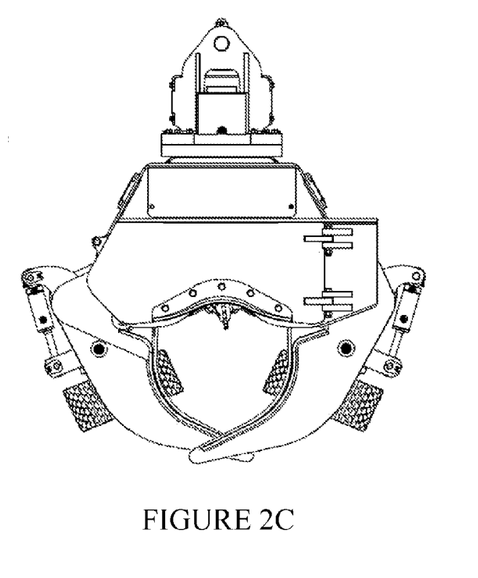
Figure 2D:
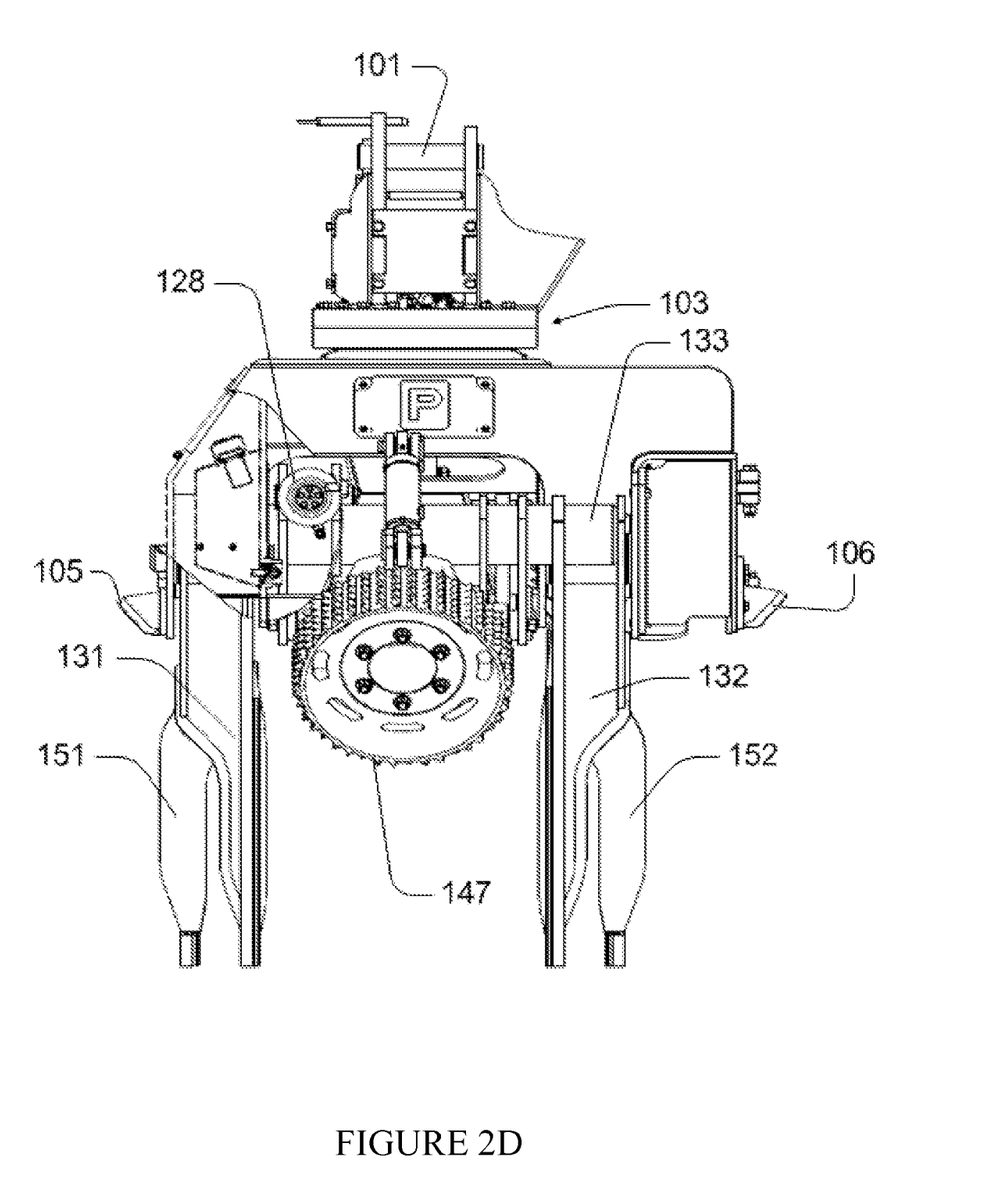
Figure 3:
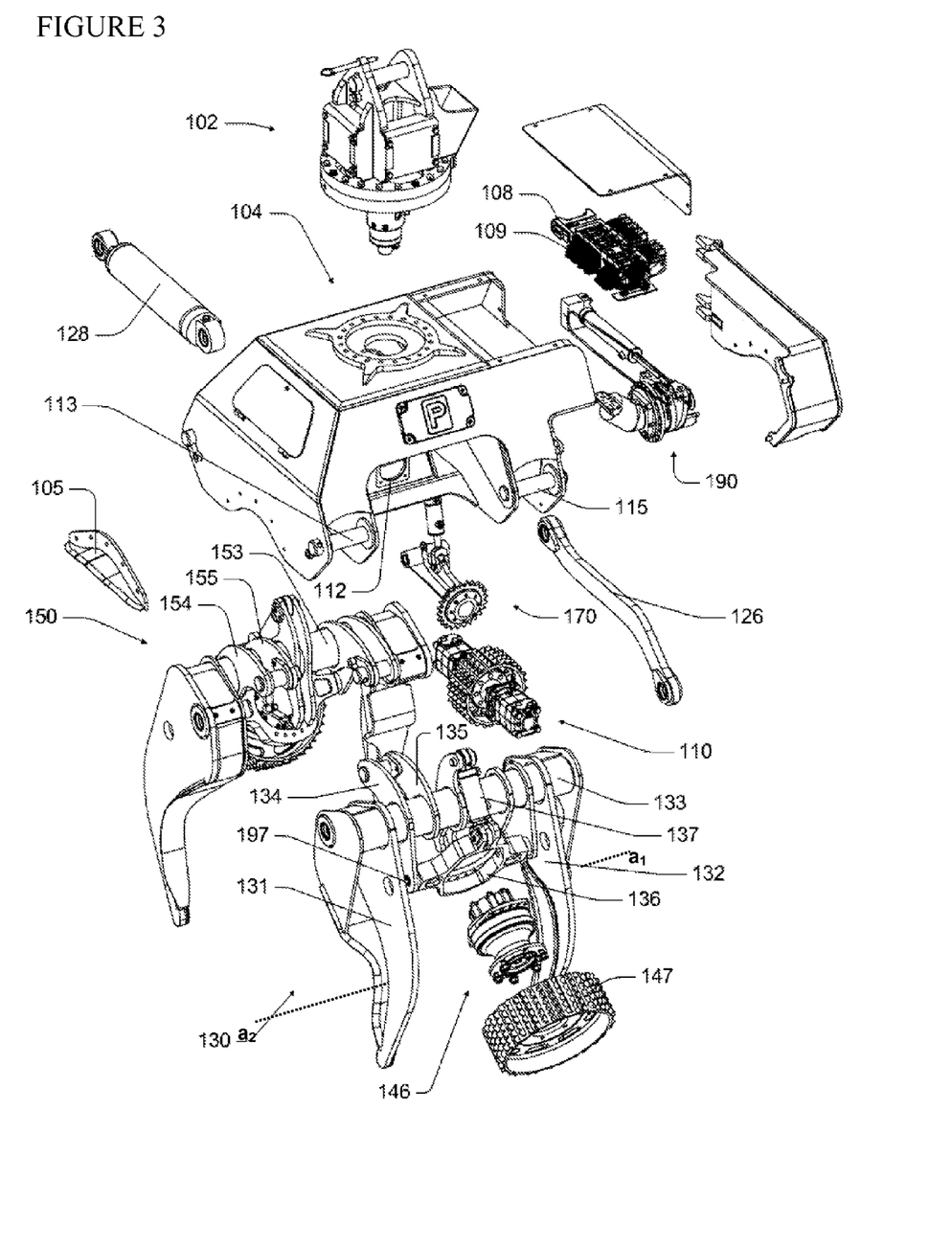
FIG. 3 is a partially-exploded perspective view of the log grapple of FIGS. 1-2D.

FIG. 1 illustrates a perspective view of a log grapple. FIGS. 2A, 2B and 2C illustrate end views of a log grapple in "start mode," "grapple mode," and "feed mode," respectively. FIGS. 2D and 3 illustrate a partial cutaway side view and a partially-exploded perspective view, respectively, of the log grapple of FIG. 1. Portions of the arm assemblies are shown in greater detail in FIG. 4.

FIG. 2A shows an end view of a log grapple in "start mode," with the arms in an open position. The first and second drive wheels can be actuated to open and close independently of the arms. Therefore, the arms can be moved to a closed position—for example, to grasp a log—while the first and second drive wheels remain in an open position ("grapple mode," FIG. 2B). When the drive wheels are also moved to a closed position, the log grapple is in "feed mode" (FIG. 2C). With the arms remaining in a closed position, the log grapple can be moved from "feed mode" to "grapple mode" by opening the drive wheels, and moved from "grapple mode" to "feed mode" by closing the drive wheels.

As perhaps shown best in FIG. 3, a log grapple may include a frame 104 coupled to one or more of a mount 102, a controller 108, a hydraulic valve assembly 109, and a central drive assembly 110. Mount 102 may be a conventional mount with an electric and/or hydraulic swivel 103 and a pin coupling 101 (FIGS. 2A, 2B), as are well known in the art. Swivel 103 may be, for example, a hydraulic and electric swivel configured to selectively rotate frame 104 by 0 to 360 degrees. Swivel 103 may be configured to continue rotating frame 104 beyond 360 degrees, through any number of full or partial 360 degree revolutions, to a desired rotary position. In some embodiments, mount 102 may be coupled to an end of a crane arm. Using a mount with a vertical height that is relatively short (i.e., in comparison to a longer hanging bracket mount) may decrease the vertical distance between the end of the crane arm and frame 104, thus increasing the vertical distance that the log grapple can be raised by the crane arm. This may allow the log grapple to be used for a wide variety of tasks (e.g., sorting logs, processing logs, and loading logs onto trucks) that would typically be done by two or more different machines.

Central drive assembly 110 may be disposed within or below frame 104. For example, as shown in FIG. 3, frame 104 typically includes one or more apertures 112 configured to retain central drive assembly 110. Controller 108 and hydraulic valve assembly 109 may be positioned within an interior compartment of frame 104. Similarly, saw assembly 190 may be retained at least partially within frame 104 and may be downwardly extendable to cut a log. Optionally, one or more delimbing knives 105/106 may be coupled to frame 104. Delimbing knives may be of the fixed mount type or the floating mount type. In some embodiments, delimbing knives 105/106 may be mounted on frame 104 with bolts or other fasteners (see e.g., FIGS. 2D and 3).

Figure 4A:
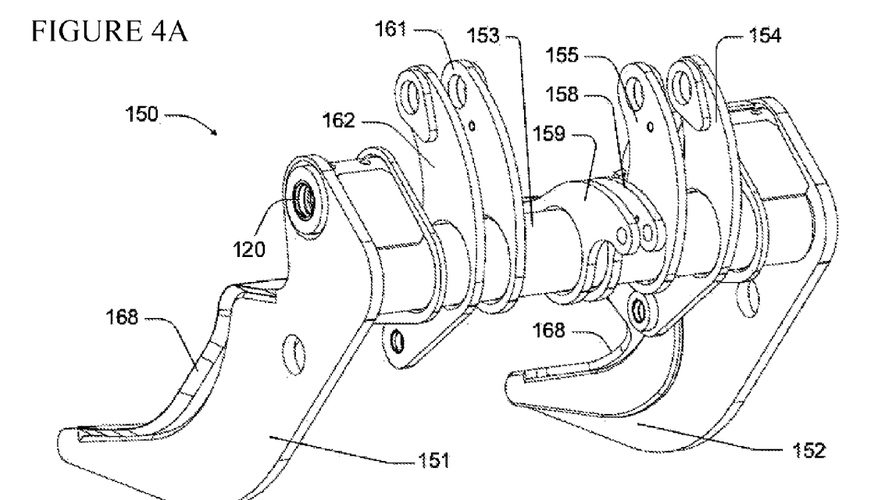
FIGS. 4A-4B are perspective views of the arm assemblies shown in FIGS. 1-3.
Figure 4B:
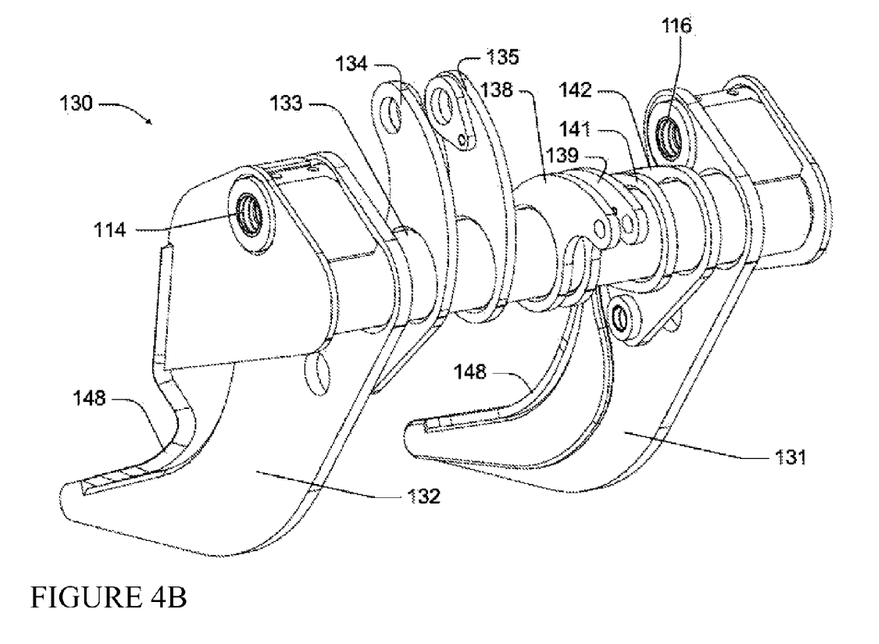

The depicted log grapple includes a first arm assembly 130, a second arm assembly 150, and a measuring wheel assembly 170. First arm assembly 130 may include arms 131 and 132, shaft 133, and plates 134, 135, 138, 139, 141, and 142 (FIGS. 3 and 4). Likewise, second arm assembly 150 may include arms 151 and 152, shaft 153, and plates 154, 155, 158, 159, 161, and 162. Shafts 113 and 115 of frame 104 may extend through channels 114 and 116, respectively, whereby arms 131 and 132 are pivotally mounted to a first side of frame 104. Corresponding shafts at a second, opposite side of frame 104 (not shown) may extend through corresponding channels (not shown), respectively, whereby arms 151 and 152 are pivotally mounted onto the second side of frame 104. The plates of each arm assembly are mounted on the corresponding shaft. In some examples, the plates may be fixedly mounted on the shaft (e.g., by welding or bolting). Shaft 133/153 may act as a torsion member to maintain rigid alignment of the plates and arms.

One or more actuators may be coupled to one or more of the arms and configured to selectively actuate the arm(s). A first end of an actuator is typically connected to the frame, to one of the arms, or to one of the arm assemblies. Another end of the actuator is typically connected to another one of the arms or to the other arm assembly. While the illustrated example includes a single actuator that connects and actuates both arm assemblies, the number and configuration of actuator(s) varies among embodiments. For example, a log grapple can include two, three, four, or more than four actuators connected to the frame at one end and to an arm or arm assembly at the other end.

As shown best in FIG. 3, shaft 133 connects arm 131 to arm 132, and shaft 153 connects arm 151 to arm 152. An actuator 128 may extend through or below a portion of frame 104. A first end of actuator 128 may be pivotally coupled to plates 134 and 135, and a second opposite end of actuator 128 may be pivotally coupled to plates 154 and 155. Actuator 128 may be a selectively extendable and retractable. In some examples, actuator 128 may include a hydraulic cylinder assembly. In other examples, actuator 128 may include a pneumatic cylinder, a spring, and/or a motor.

A link assembly 126 may be pivotally connected to first arm assembly 130 and second arm assembly 150. A first end of link assembly 126 may be coupled to plates 141 and 142, and an opposite second end may be coupled to plates 161 and 162, by one or more pins, shafts or pivotable members. Link assembly 126 may act as a timing member to ensure that opposing arms operate in unison (e.g., closing to an equal degree and/or at the same time). In other embodiments, two actuators may be arranged to operate each arm independently, and a hydraulic pressure balance may be provided between the actuators to keep the arms operating in unison. However, a link may be provided in this and other embodiments to mechanically augment the operation of the arms in unison.

In the depicted embodiment, first arm assembly 130 and second arm assembly 150 each includes a corresponding drive mount, drive mount actuator, drive assembly and drive wheel. As described above, first arm assembly 130 may be pivotally coupled to frame 104 by shafts 113 and 115. Shafts 113/115 may define a first axis of rotation around which the first arm assembly 130 (including arms 131 and 132, plates 134, 135, 138, 139, 141, and 142, shaft 133, drive mount 136, drive assembly 146, and drive wheel 147) can be selectively rotated as a unit. In addition, drive mount 136 may be pivotally coupled to first arm assembly 130, such that drive mount 136, drive assembly 146, and drive wheel 147 are selectively rotatable around a second axis of rotation. The second axis of rotation may extend parallel to the first axis of rotation. Second arm assembly 150 may be coupled to another portion of the frame and configured in the same or similar manner as first arm assembly 130.

As best shown in FIGS. 2A and 3 with respect to first arm assembly 130, drive mount actuator 137 may be pivotally coupled at a first end to plates 138 and 139. The second end of drive mount actuator 137 may be pivotally coupled to drive mount 136. Drive mount 136 can in turn be pivotally coupled to plates 134 and 142 by one or more pins 197 (FIG. 3) or other pivotable coupler(s). The pin(s) or pivotable coupler(s) may define the second axis of rotation.

The extension or retraction of actuator 128 causes rotation of first arm assembly 130 around the first axis (shafts 113 and 115). In contrast, the extension or retraction of actuator 137 causes rotation of drive mount 136, drive assembly 146, and drive wheel 147 around the second axis. Actuators 128 and 137 may be actuated/controlled separately.

Actuator 137 may be actuated to rotate drive mount 136 around the second axis with the arms in a closed position, in an open position, or in any intermediate position between open and closed, while the arms are being repositioned by the extension/retraction of actuator 128, and/or while the arms are maintained in any position. Likewise, the extension/retraction of actuator 128 without actuation of actuator 137 provides rotation of the arms around the corresponding shaft while drive assembly 146 and drive wheel 147 remain at a constant offset with respect to arms 131 and 132. Therefore, actuators 137 and 128 may be actuated alone or in combination to position drive wheel 147 at a desired distance from the opposing drive wheel and a desired offset with respect to the arms 131 and 132.

In operation, the arms 131, 132, 151, and 152 may be closed around a log while the drive wheels are maintained in the open position. This "grapple position" may prevent damage to the log from the drive wheels and allow arms 131, 132, 151, and 152 to penetrate a deck or stack of logs. The drive wheels can be closed around the log to assume a "feed position," and the drive wheels can be rotated by the corresponding drive assemblies to drive the log through the log grapple between the closed arms. This may be done, for example, to place the log's center of gravity closer to the arms or to feed the log in a desired direction without releasing the log from the arms. The drive wheels can be opened again to release the log onto the closed arms in a desired position, and the arms can be opened to release the log at a desired location. Optionally, one or more delimbing knives 148 and/or 168 may be coupled to arms 131, 132, 151, and/or 152, and driving the log (or a tree) through the log grapple would typically remove branches from the log or tree.

While the above description refers primarily to first arm assembly 130, it is to be understood that the second arm assembly 150 includes corresponding elements and functions in a substantially similar manner unless otherwise indicated. The log grapple may be provided with arms, drive wheels, and other components in various dimensions to selectively grasp, retain, and release logs of various diameters. In some examples, the log grapple may be configured to retain, with the first and second pairs of arms in the closed position, a log (or a group of logs) having a diameter in the range of 40" to 58". In other examples, the log grapple may be configured to retain, with the first and second pairs of arms in the closed position, a log (or a group of logs) having a diameter in the range of 35" to 52". Alternatively, the log grapple may be configured to retain a log (or a group of logs) having a diameter in the range of 20" to 40", 30" to 50", 40" to 60", 50" to 70", or 40" to 80". For instance, the log grapple may be configured to retain a log (or a group of logs) having a diameter of up to 52".

Figure 5:
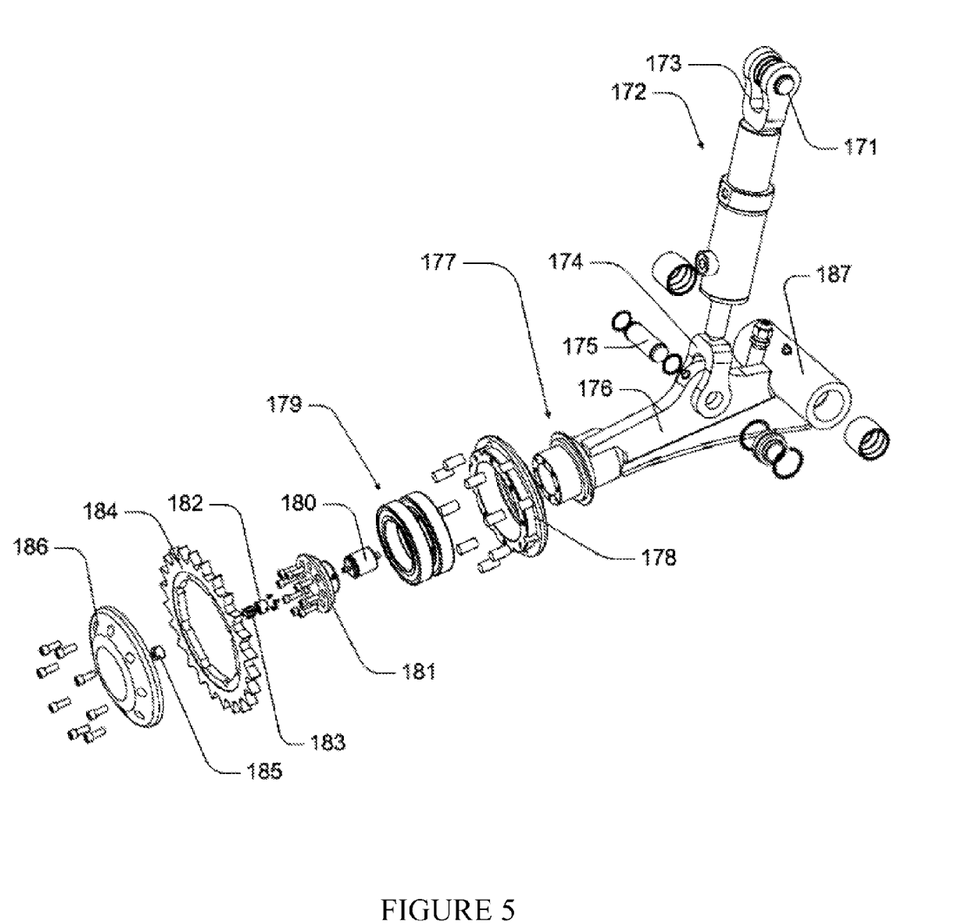
FIG. 5 is a perspective, exploded view of a measuring wheel assembly of the log grapple of FIGS. 1-3.
Figure 6:
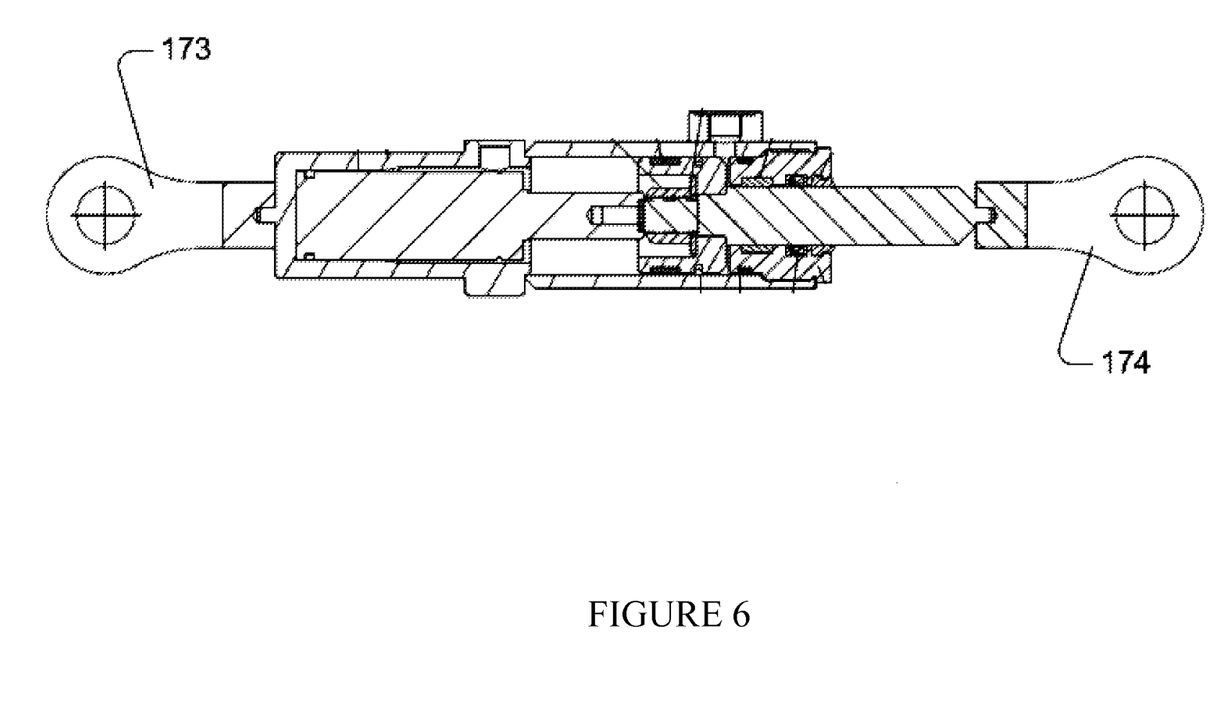
FIG. 6 is a side elevation sectional view of an actuator that may be used with the measuring wheel assembly of FIG. 5.

FIGS. 5 and 6 illustrate a measuring wheel assembly and an actuator for use with the measuring wheel assembly of FIG. 5, respectively. Although this example is discussed with reference to a log grapple, the measuring wheel assembly and actuator may be used with known log grapples, processor heads, harvester heads, and other similar apparatuses that include a log measuring device, and the present disclosure is intended to encompass all such uses and combinations.

As shown in FIG. 5, a measuring wheel assembly may include an actuator 172 with a pivotable coupler 173 at a first end and a pivotable coupler 174 at a second end. Coupler 173 may be coupled to a frame of a log grapple by pin 171, and coupler 174 may be coupled to a rigid member 176 by pin 175. The measuring wheel assembly, or portion thereof, may be coupled to the frame of a log grapple with independently movable drive wheels as described above. For example, pivotable coupler 173 may be connected to a lower portion of the frame of the log grapple between the first and second pairs of arms. In some examples, the measuring wheel assembly may be extended and/or retracted independently of the position of the arms.

Rigid member 176 may be rigidly connected to support 187 and bearing coupler 177. Rigid member 176, support 187, and coupler 177 may be attached to the frame of the log grapple by a pin (not shown). Bearing coupler 177 may be coupled to hub 178. Coupler 177 and/or hub 178 may retain a bearing assembly 179, an encoder 180, and a retainer 181. Encoder 180 may be coupled to hub coupling 182, center coupling 183, and coupling 185. Measuring wheel 184 may be fitted over hub 178, and cap 186 may be coupled to measuring wheel 184 and hub 178. In some examples, the measuring wheel assembly may be positioned below the frame of the log grapple with rigid member 176 extending substantially perpendicular to the first axis of rotation (e.g., shafts 113 and 115). The configuration of the measuring wheel assembly may vary among embodiments. For example, cap 186 may retain hub 178 and measuring wheel 184. Alternatively, cap 186 may retain only hub 178, and measuring wheel 184 may be coupled to hub 178.

In one embodiment, the measuring wheel assembly includes a hydraulic pressure system operable to extend and retract measuring wheel 184 toward and away from a log that is retained within the arms of the log grapple or other device. The hydraulic pressure system typically includes a first hydraulic circuit for extension of the measuring wheel and a second hydraulic circuit for retraction of the measuring wheel. In addition, an accumulator may be provided with the first hydraulic circuit in order to maintain hydraulic pressure within a desired range while the measuring wheel assembly is in use.

In another embodiment, the measuring wheel assembly includes a first actuator for extension of the measuring wheel 184 and a second actuator for retraction of the measuring wheel. The first and the second actuator may be integrated within a single unit. In the example shown in FIG. 6, the second actuator is a hydraulic cylinder assembly and the first actuator is a gas spring disposed within the hydraulic cylinder assembly. The gas spring is operable to extend and maintain measuring wheel 184 in contact with a log while the log is measured. Hydraulic pressure is used to retract measuring wheel 184. In comparison to hydraulic-hydraulic actuator configurations, this hydraulic-gas spring configuration may require only one hydraulic circuit and does not require an accumulator.

A system for moving, sorting, and/or loading logs may include a base, a crane arm coupled to the base, and a log grapple as described above. The log grapple may be pivotally coupled to the crane arm. The base may be a stationary apparatus such as a tower or a trailer. Alternatively, the base may be a mobile apparatus such as a motorized vehicle (e.g., an excavator or a tractor) driven on wheels or tracks. The crane arm may be any type of crane arm, including but not limited to articulated, pivotable, and/or extendable crane arms. Optionally, the crane arm may include a fixed heel or an adjustable heel. For example, the crane arm may include an adjustable heel and a hydraulic system coupled to the crane arm and the adjustable heel. One end of the adjustable heel may be coupled to the log grapple, and the other may be selectively positionable to contact a log grasped within the log grapple. The hydraulic system may be coupled to the crane arm adjacent to the second end or to another portion of the crane arm. The hydraulic system may be coupled to one or more controls on the base. However, a heel is not necessary, and in some embodiments the crane arm lacks a heel. The log grapple may be coupled to any type of crane arm. Crane arms and bases suitable for use with crane arms are well known in the art, and will not be described further herein.

The system may be operated to move logs toward a loading site, to sort logs, and/or load logs onto a transport. The arms may be used to pick up and transport one or more logs without engaging the drive wheels with the log(s). For example, the arms may be used to pick up multiple logs at once or to pick up a single log from a pile of logs. Alternatively, the drive wheels can be engaged to drive or feed the log toward a desired location while the crane arm and/or log grapple is moved or turned. This may increase the distance that the log can be moved toward the location without repositioning the base. In addition, the drive wheels can be used to reposition the log within the arms of the log grapple without releasing the log from within the arms.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A log grapple comprising:
a frame;
a first arm assembly having a first shaft and at least a first pair of arms mounted along the first shaft, the first shaft coupled to the frame and defining a first axis, the first arm assembly being rotatable about the first axis;
a second arm assembly having a second shaft and at least a second pair of arms mounted along the second shaft, the second shaft coupled to the frame and defining a second axis that is substantially parallel to the first axis, the second arm assembly being rotatable about the second axis; and
a first and a second drive wheel assembly, the first drive wheel assembly comprising a first drive wheel and a first plurality of plates, the second drive wheel assembly comprising a second drive wheel and a second plurality of plates, the first drive wheel assembly pivotally coupled to the first shaft between the first pair of arms and rotatable about the first axis, and the second drive wheel assembly pivotally coupled to the second shaft between the second pair of arms and rotatable about the second axis,
wherein the first and second pairs of arms are selectively movable from an open position to a closed position, and
wherein the first and second drive wheel assemblies are selectively pivotable between an open position and a closed position independently of the first and second pairs of arms.

2. The log grapple of claim 1, wherein the first drive wheel assembly further comprising a first drive mount, the first plurality of plates mounted to the first shaft, and the first drive mount pivotally coupled to at least one of the first plurality of plates.

3. The log grapple of claim 2, wherein the first plurality of plates is pivotable around the first axis, and the drive mount is pivotable around a third axis extending substantially parallel to the first axis.

4. The log grapple of claim 3, further comprising a drive mount actuator coupled to the first shaft and the drive mount, the drive mount actuator selectively actuable to pivot the drive mount around the third axis.

5. The log grapple of claim 3, further comprising an actuator extending from the first arm assembly to the second arm assembly, the actuator selectively actuable to pivot the first arm assembly around the first axis.

6. The log grapple of claim 2, further comprising a first drive coupled to the first drive wheel and the drive mount, the first drive configured to drive rotation of the first drive wheel in a first rotational direction and in an opposite second rotational direction.

7. The log grapple of claim 1, further comprising a mount coupled to the frame, the mount configured to pivotally couple the frame to a crane arm.

8. The log grapple of claim 1, further comprising one or more of a delimbing knife or a saw assembly mounted to the frame.

9. The log grapple of claim 1, further comprising a measuring wheel assembly coupled to the frame, wherein the measuring wheel assembly comprises a first actuator and a measuring wheel.

10. The log grapple of claim 9, wherein the first actuator comprises a hydraulic cylinder operable to extend and retract the measuring wheel.

11. The log grapple of claim 9, wherein the
first actuator is configured to extend the measuring wheel in a first direction and retract the measuring wheel in an opposite second direction, and
wherein the first actuator comprises no more than one hydraulic circuit.

12. The measuring wheel assembly of claim 11, wherein the first actuator comprises a hydraulic cylinder.

13. The log grapple of claim 1, wherein the log grapple is configured to selectively retain, with the first and second pairs of arms in the closed position, a log or group of logs having a diameter of up to 52".

14. A system for loading logs onto a transport, the system comprising:
a base;
a crane arm with a first end and a second end, the second end coupled to the base; and
a log grapple pivotally coupled to the crane arm, the log grapple having:
a frame
a first arm assembly having a first shaft and at least a first pair of arms mounted along the first shaft, the first shaft coupled to the frame and defining a first axis, the first arm assembly being rotatable about the first axis;
a second arm assembly having a second shaft and at least a second pair of arms mounted along the second shaft, the second shaft coupled to the frame and defining a second axis that is substantially parallel to the first axis, the second arm assembly being rotatable about the second axis; and
a first and a second drive wheel assembly, the first drive wheel assembly comprising a first drive wheel and a first plurality of plates, the second drive wheel assembly comprising a second drive wheel and a second plurality of plates, the first drive wheel assembly pivotally coupled to the first shaft between the first pair of arms and rotatable about the first axis, and the second drive wheel assembly pivotally coupled to the second shaft between the second pair of arms and rotatable about the second axis,
wherein the first and second pairs of arms are selectively movable from an open position to a closed position, and
wherein the first and second drive wheel assemblies are pivotable toward and away from one another independently of the first and second pairs of arms.

15. The system of claim 14, the log grapple further including a drive mount, wherein the first pair of arms and the drive mount are pivotably mounted on the first shaft.

16. The system of claim 15, further including a heel coupled to the crane arm.

17. The system of claim 15, further including an actuator coupled to the heel and the log grapple.

18. The system of claim 14, wherein the base is a tracked or wheeled motor vehicle.

* * * * *